No. 891,498. PATENTED JUNE 23, 1908.
A. MICHELIN.
PNEUMATIC TIRE FOR WHEELS OF VEHICLES.
APPLICATION FILED DEC. 30, 1907.

Witnesses:
O Henry Thieme
F. George Barry,

Inventor:-
André Michelin
by attorneys

UNITED STATES PATENT OFFICE.

ANDRÉ MICHELIN, OF PARIS, FRANCE.

PNEUMATIC TIRE FOR WHEELS OF VEHICLES.

No. 891,498.     Specification of Letters Patent.     Patented June 23, 1908.

Application filed December 30, 1907. Serial No. 408,475.

*To all whom it may concern:*

Be it known that I, ANDRÉ MICHELIN, citizen of the Republic of France, and resident of 105 Boulevard Péreire, Paris, in the said Republic, engineer, have invented a new and useful Improvement in Pneumatic Tires for Wheels of Vehicles, of which the following is a specification.

The invention relates to an improvement in the safety bolts serving to prevent the displacement of the outer cover of tires on the rim of wheels, and this improvement, which is equally applicable both in the case of fixed rims and of detachable rims, consists essentially in the suppression of one of the two wings of such bolts, so that they only secure one edge of the cover, that which is situated on the side nearest the carriage. The great advantage of this arrangement is that of facilitating the fixing of the cover and of the inner tube, and especially of enabling the inner tube to be replaced without having to remove the safety bolts.

The invention, moreover, comprises details in the construction of safety bolts with a single wing, as well as the method of mounting same on a fixed or a detachable rim.

Figure 1:
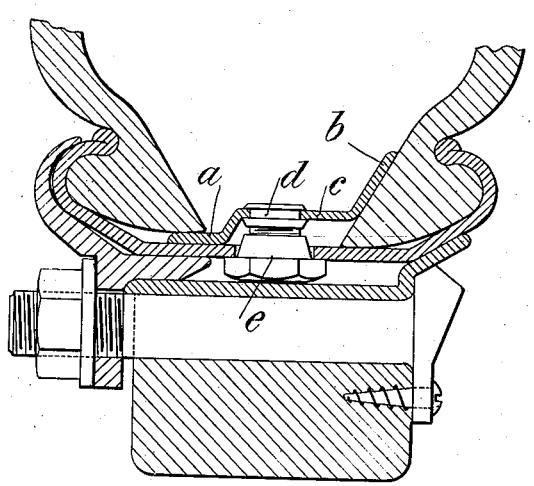
Figure 2:
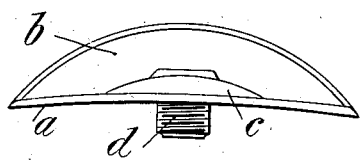
Figure 3:
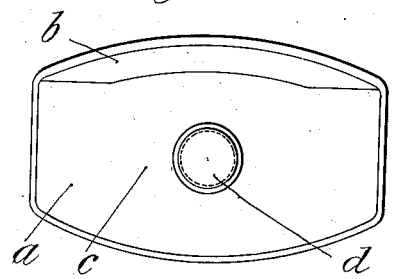
Figure 4:
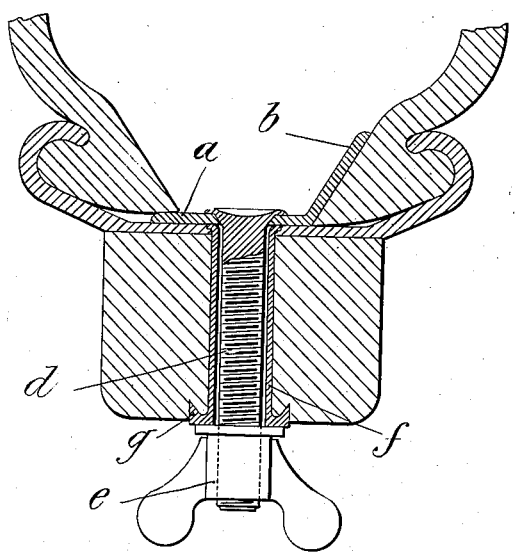
Figure 5:
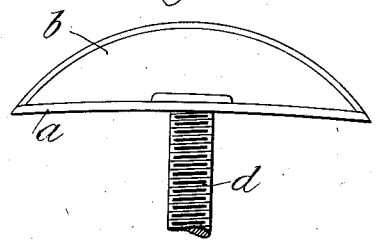
Figure 6:
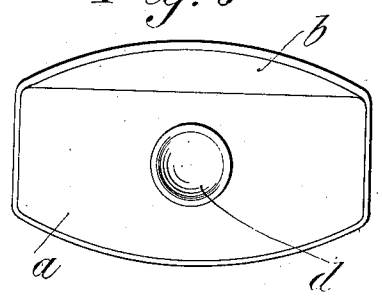

In the accompanying drawing, Figure 1 shows a transverse section of a tire for a detachable rim, the section being taken through the axis of one of the safety bolts. Figs. 2 and 3 are detached views of the improved safety bolt, in side elevation and plan respectively. Fig. 4 is a transverse section of a tire for a fixed rim, taken through the axis of one of the single wing safety bolts, the bolt being shown in side elevation in Fig. 5 and in plan in Fig. 6.

As will be seen in these figures, the head *a* of the safety bolt, both for detachable rims and for ordinary wheels, is provided with a single wing *b* bearing upon the edge of the cover situated nearest the carriage. In the case of a detachable rim, an off-set *c* is formed in the center of the head *a*, so as to raise the point of attachment of the short bolt *d*, which is preferably secured in this head by means of a collar and a riveted upper end. The tightening nut *e* is caused to bear against the inner face of the detachable rim, and it is formed with a circular part passing through an opening in such rim, so as to augment the number of threads engaged. In the case of fixed rims, the safety bolts have a long stem *d* connected to the head *a* as shown in Figs. 4, 5 and 6, and preferably passing through a sleeve *f* (Fig. 4), terminating in a chamfered collar *g* bedding into the wooden rim and against which bears the thumb or winged nut *e*.

What I claim as my invention and desire to secure by Letters Patent, is:—

1. A bolt for maintaining in position on the rim of a wheel one edge only of the outer cover of a pneumatic tire, composed: of a screw-threaded stem; a plate fixed perpendicularly on the extremity of this stem; a wing formed on this plate, inclined at an angle suitable for bearing against one of the edges of the cover of the tire; and of a nut screwing on to the said stem.

2. A bolt for maintaining in position on the rim of a wheel one edge only of the outer cover of a pneumatic tire, composed: of a screw-threaded stem; a plate fixed perpendicularly on the extremity of this stem and raised at the part where the said stem is attached; a wing on this plate, inclined at an angle suitable for bearing against one of the edges of the cover of the tire; and of a nut provided with a cylindrical extension capable of entering an opening formed in the rim.

In testimony that I claim the foregoing as my invention, I have signed my name in presence of two witnesses, this sixteenth day of December 1907.

ANDRE MICHELIN.

Witnesses:
    HANSON C. COXE,
    ALCIDE FABE.